April 15, 1941.  N. NAZAR  2,238,071
ELECTRIC DASHBOARD GAUGE FOR AUTOMOBILES
Filed Nov. 10, 1937  2 Sheets-Sheet 1
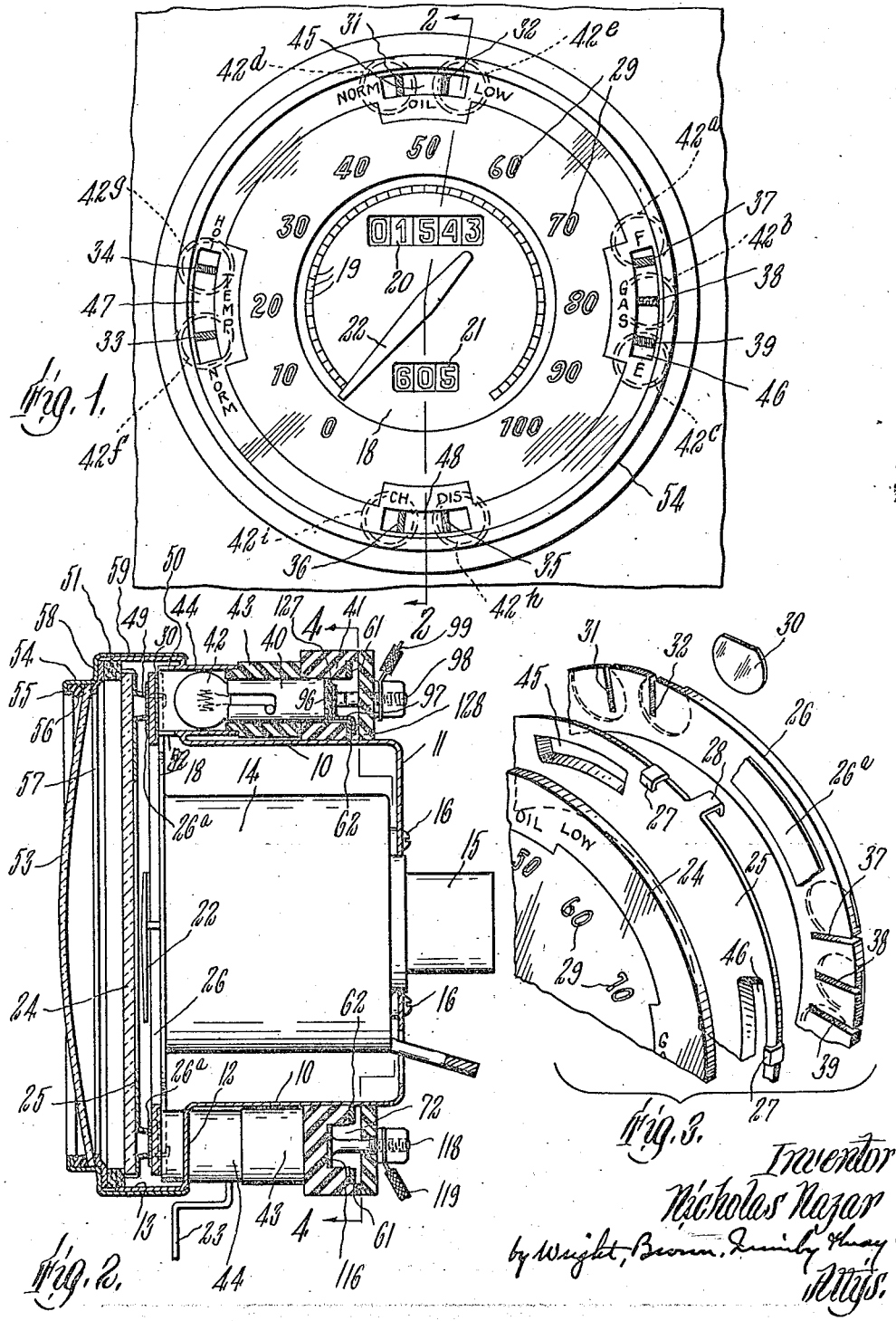

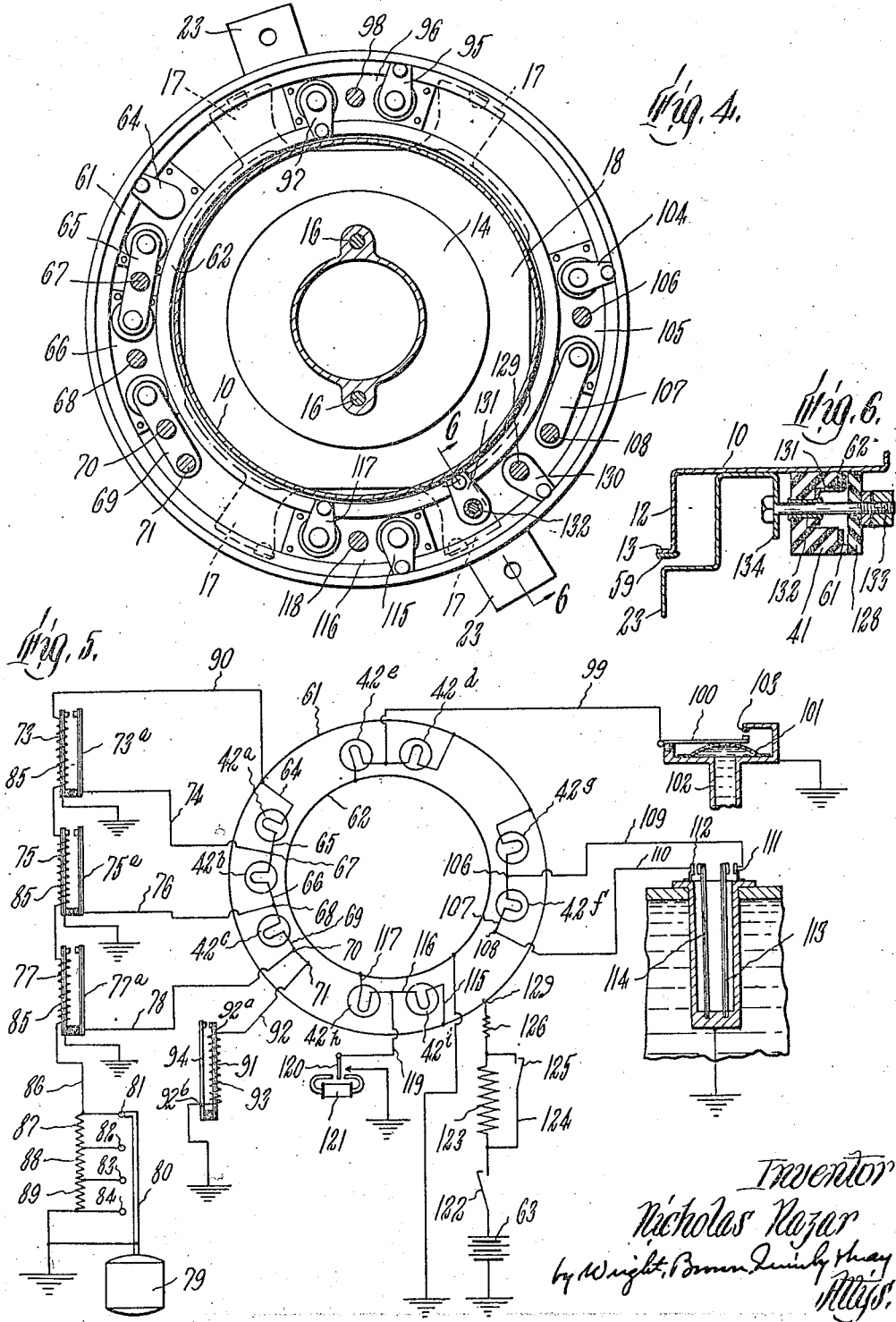

Patented Apr. 15, 1941

2,238,071

UNITED STATES PATENT OFFICE 2,238,071

ELECTRIC DASHBOARD GAUGE FOR AUTOMOBILES

Nicholas Nazar, Boston, Mass., assignor to Waltham Watch Company, Waltham, Mass., a corporation of Massachusetts Application November 10, 1937, Serial No. 173,873

1 Claim. (Cl. 73—365)

One object of the present invention is to provide an electric indicator or gauge, without moving parts, adapted to be mounted in an automobile under the eye of the driver, and to be actuated by the current from the storage battery of the automobile, to give necessary information, such as the condition of the fuel supply, the pressure of oil in the engine lubricating system, the temperature of the water in the engine cooling system, the condition of the battery, whether it is being charged or discharged, etc. Another object is to combine means for giving any of the foregoing particulars of information, or other information capable of being similarly indicated, with a dashboard instrument such as a speedometer or a clock. Another object is to indicate the condition of the fuel supply, oil pressure, water temperature, battery charge, etc. or any one or more of them, in a manner sufficiently precise to avoid harm, by electrical means devoid of moving parts at the dial or face of the instrument, and in which the indications are made by lights of different colors. Another object is so to construct and combine the parts of the instrument which give the particulars of information above referred to, or any of them, with a dial showing other information, such as the rate of speed or present time, so that the same sources of light which provide the indications of fuel level, oil pressure, etc. will serve also to illuminate the numbers on the dial. Another object is to combine two or more of the features herein referred to in a single combined instrument of compact and simple structure, and in which the sources of light are inexpensive electric light bulbs mounted in a manner such as to permit easy access when renewal of a burnt out bulb is required.

In the accomplishment of these objects I have produced a combined instrument having a speedometer with associated odometer in its center (for which a clock may be substituted if desired), and having a series of other indicators arranged around the circumference of the speedometer or clock dial, within the case of the combined instrument, together with screens and reflecting surfaces arranged to cause the sources of light to perform a double function, and electrical connections whereby the light sources are activated in a manner such as to effect the desired results. One embodiment of such an instrument is shown in the accompanying drawings and described in the following specification, as an illustration of the principles of the invention but without intent to indicate limitations thereof to the details of the instrument so shown.

In the drawings—

Fig. 1 is a front or face view of the combined instrument referred to;

Fig. 2 is a cross section taken on line 2—2 of Fig. 1;

Fig. 3 is an exploded fragmentary perspective view of the parts of the instrument by which information is conveyed to the driver of the automobile;

Fig. 4 is a vertical section taken on line 4—4 of Fig. 2;

Fig. 5 is a diagram of the electrical circuits and circuit closing means of the combined instrument;

Fig. 6 is a detail sectional view taken on line 6—6 of Fig. 4.

Describing first the construction of the instrument here shown; there is a casing having a cylindrical side wall 10, a rear wall 11, an annular front wall 12 projecting outwardly from the side wall, and a flange 13 extending from the outer circumference of the annular wall 12 in the opposite direction from the main side wall 10 and coaxial therewith. A speedometer instrument 14, containing also an odometer, is mounted in the main casing above described with its drive shaft housing 15 projecting through a central hole in the wall 11, and the rear part of its frame is secured to said wall by screws 16 or equivalent fastenings. The speedometer is shown here only in a conventional manner, and is represented in Fig. 4 as though it were entirely enclosed in a frame or casing. The forward end of its frame or casing has outstanding lugs 17, shown dotted in Fig. 4, which have a mechanical function. A face plate 18 is connected with these lugs over the forward end of the speedometer and carries graduations 19 and has windows through which the main odometer 20 and trip odometer 21 are exposed to view. The speedometer hand or pointer is mounted to rotate over this face plate.

The main casing 10—13 and speedometer casing with its flanges 17, being rigidly connected together, provide the base on which other parts of the combination instrument are mounted. Brackets 23 are secured to the exterior of the casing wall 10 for the purpose of securing the instrument to the instrument board of an automobile.

A transparent dial plate 24, preferably of thick glass, an annular opaque shield 25, and a ring 26, which I call an index ring, for reasons which will presently appear, are associated together and with the speedometer frame in a manner to cooperate with the indicator pointer and the electric light bulbs or light sources presently described. The annular shield 25 is opaque. It has a central opening of a radius slightly longer than the speedometer hand 22. It is made of sheet metal provided on its outer circumference with forwardly projecting hooks 27 which overlie and confine the rim of the dial plate 24, and rearwardly projecting hooks 28 which pass over the index ring and engage the lugs 17 of the speedometer casing. A sufficient number of both sets of hooks are provided to centralize the rings and dial plate with the speedometer and clamp all of these parts securely together. The dial plate has etched in its rear face numbers 29 to indicate speeds in connection with the pointer 22. Words or abbreviations are also etched in its rear surface adjacent to the locations of the indicators for fuel level, oil pressure, water temperature, battery condition, etc.

The index ring is so called because it contains indices for showing the conditions of fuel level, etc., in conjunction with light sources back of the ring and with the words or equivalent markings last referred to on the dial plate. Here the indices referred to are slots or holes in the ring, which is opaque in itself, so arranged that light from electric light bulbs in rear of the ring may pass through them. A shielded light bulb is mounted in rear of each slot or notch, and different bulbs are selectively activated to emit light through one or another of the openings according to the conditions to be indicated. Preferably light filters 30 are mounted across the openings at the rear of the ring. These light filters may be disks of glass or of any desired flexible translucent material and may be set into shallow recesses cut or molded in the rear face of the ring. The filters may have any desired colors, but I prefer to use those which have already acquired a definite conventional meaning in connection with automobile traffic, such as green, red and amber. A mask 26a of translucent material is applied on the face of the index ring over the index openings therein for the purpose of obscuring such openings except when the lamps (presently described) back of the openings are made active. The mask has such a quality of partial opacity that it makes the openings practically invisible when illuminated only by light impinging on the instrument from in front and when the regions back of the openings are in obscurity. But it is translucent enough to allow passage of light rays from the lamps back of the slots whenever such lamps are made active. While it is possible to provide a separate mask over each opening, and such masks may be made and applied in a variety of ways, I prefer to use a single thin flat band or washer-like ring of suitable material, such as Celluloid of neutral color, and cement it to the face of the index plate so that it extends over all of the openings.

I have found that in the ordinary use of an automobile it is of no value to the driver to know what the exact pressure of oil in the lubricating system or the exact temperature of water in the cooling system is. All he need know in order to avoid risk of injury to the engine is that the oil pressure is high enough and that the water temperature is not too high. Therefore I have provided as the oil pressure indicator a slot 31, with a green light filter back of it and an opening 32 with a red filter back of it in association with the abbreviation "Norm," meaning normal or sufficient pressure, and "Low," meaning that the oil supply needs replenishing. The words "Norm" and "Low" are etched on the back of the dial plate beside the openings 31 and 32 respectively and in conjunction with the word "Oil" to convey the intended meaning to the observer.

Similarly a hole 33 covered by a green filter and a slot 34 covered by a red filter are provided in the index ring adjacent to the indications "Temp," "Norm" and "Hot" on the dial plate to indicate that when the green light appears the temperature is low enough for safe operation, and when the red light shows that the engine is overheated or in danger of being so. Other openings 35 and 36 backed by green and red filters respectively are provided in the ring adjacent to the words "Charge" and "Discharge," or equivalent abbreviations, on the dial, to show the situation as to the battery, whether its charge is being augmented by the generator or is being depleted.

Somewhat more detailed information as to the fuel supply is needed to safeguard the driver from running short of fuel in different circumstances, and for that purpose I have provided three openings 37, 38 and 39 in the index ring beside the abbreviation "Gas" on the dial plate, these openings being covered respectively by a green filter to show that the tank is full or nearly so, an amber filter to show that it is in the neighborhood of half full, and a red filter to show that it is nearly empty. I may also employ means for flashing the light back of the red opening when the level becomes so low that immediate replenishment is necessary to avoid exhaustion of the fuel supply.

The lamps for illuminating the various openings are mounted in sockets 40 secured to a channel ring 41 which fits slidably on the outside of the casing wall 10. All of the lamps are designated by the numeral 42 and specific lamps are distinguished from one another in the further description by appropriate exponents. The lamp sockets may be like those commonly used with miniature lamps and have the usual provisions for detachably holding and securing the bases of the lamps, and insulating from one another the conductive portions which make contact with the opposite terminals of the lamp. Each is surrounded by a bushing 43 of insulating material and the ring 41 in which they are all set is also of insulating material.

The lamps project from the forward side of the ring 41. Secured to the annular front wall 12 of the casing and passing through it are tubular light shields 44, each of which is alined with one of the lamp socket bushings and is of the right inside diameter to receive the lamp bulb and to slip over the rabbeted forward end of the adjacent bushing 43, substantially as shown in Fig. 2. These shields, and correspondingly the lamps, are spaced around the axis of the instrument approximately in register with the slots or openings 31–39 inclusive. That is, they are so spaced as to permit the light from one lamp to pass through each opening severally, and exclude the light of all other lamps from that opening. The shield 25 has windows 45, 46, 47 and 48 alined with the respective groups of slots, the rims 49 of which (see Fig. 2) are offset rearwardly to bear on the index ring, each framing the adjacent group of slots, and all collectively providing spacing means by which the dial plate 24 is held clear of the pointer 22.

The tubular shields 44 project to some extent forwardly from the front wall 12 of the casing, and the forwardly projecting extremity of each has a notch 50 in the outer side (that is, the side next to the encircling flange 13 of the casing) through which light rays from the lamp are enabled to pass and impinge on the inner surface of the flange. Such surface is made light reflecting, preferably in a manner which diffuses the light also, and for this purpose may be coated with white paint, although any other means for effecting sufficient reflection is within the scope of the invention. The circumference of the dial plate is exposed to the light reflected from this surface, and the plate is made thick enough so that enough reflected light passes into it between its front and rear faces to illuminate the figures and other indicia etched on its rear face. The light rays which enter the dial plate from the reflecting surfaces pass almost entirely in lines which make angles with the front face of the plate less than the angle of total reflection, whence substantially all of the light which is emitted from the dial is that reflected from its rear face and from the opaque annular shield 25. If other material than glass is used for the dial plate, a material is selected which has an index of refraction such as to obtain substantially these effects. The lamp shields also have notches 52 at the inner sides of their forward extremities through which light sufficient to illuminate the pointer 22 and the face of the plate 18 may pass.

The forward end of the instrument is finished and covered by a crystal 53, which may be of glass or of any suitable non-breakable transparent substance and is mounted in a bezel 54 between an inwardly turned flange 55 on the outer end of the latter and a gasket 51. A gasket 56 is placed between the rim of the crystal and the flange 55. A ring 57 is clamped at its outer margin between the gasket 51 and an inturned shoulder 58 of the bezel, and its inner margin is extended and offset outward to hold the rim of the crystal against the gasket 56. The bezel is made with a flange 59 surrounding the flange 13 of the casing and inturned at its rear extremity around the base of the flange 13, whereby the parts last described are securely and firmly held together.

It should be noted that the gasket 51 is opaque, at least as to its rear face, and that the dial plate is of smaller diameter than the inside of the reflecting flange 13, features which are important, if not essential, to the attainment of the optical effects described.

The electrical means by which different lamps are illuminated in accordance with the conditions required to be indicated, will now be described, with reference first to the fuel level indicator. This indicator in the present illustration consists of three lamps which are designated in the diagrammatic Fig. 5 as 42a, 42b and 42c. They are connected in series between the source of current, i. e., one pole of the storage battery, and the frame of the automobile, which is here designated as ground, and through which the circuit is completed to the opposite pole of the battery. As a convenient means for making such connections, not only with the lamps above referred to, but also with those of the other indicators as well, I have provided conductive rings 61 and 62 which serve as bus bars and are mounted on coaxial separated shoulders at the rear of the insulating ring 41. The bus bar 61 is connected with the storage battery 63 of the automobile through connections later described, and one terminal of the lamp 42a is connected to this bus bar by a tab 64 (see Fig. 4) and suitable conductive means of well known character in the lamp socket. Conductors 65 and 66 connect the lamps 42a, 42b and 42c in series, and from these conductors binding posts 67 and 68 project for making connection with intermediate circuit conductors. A conductor 69, having binding posts 70 and 71, is connected in further series with lamp 42c. These conductors are located in a channel 72 in the rear side of the insulating ring 41, and the binding posts above described are firmly mounted in the ring. Similarly mounted are the conductors and binding posts in the lamp circuits of the other indicators.

Individual switches between each of the lamps herein described and ground are provided at some convenient point adjacent to the indicating instrument. A switch 73 is connected by a conductor 74 with the binding posts 67; a switch 75 through conductor 76 with the binding post 68; and a switch 77 through conductor 78 with the binding post 70. When switch 73 is closed the lamps 42b and 42c are short-circuited, and when 75 is closed, lamp 42c is short-circuited. These two switches suffice for operation of a three-stage indicator if the third lamp is connected to ground. The third switch (77) is provided, cooperating with other apparatus, presently described, to cause flashing of the lamp 42c when the fuel is dangerously low. These lamps have respectively different resistances and their resistances and the current are mutually so adjusted or regulated with respect to one another that, when the full service current flows through two or three connected in series, only the one having the highest resistance (greatest voltage drop between its terminals) will light. If it be assumed that lamp 42c has the highest resistance, and 42b, a resistance intermediate those of 42c and 42a, then if switch 77 its closed and the other two switches are open, while current flows, only the lamp 42c will emit light. If switch 75 is closed while switch 73 remains open, a short circuit will be established around lamp 42c of low enough resistance to prevent this lamp from giving light, even though switch 77 may be closed at the same time, and the stronger current then flowing through lamp 42b will cause this lamp to be lighted. Likewise closing of switch 73 establishes a short circuit around lamp 42b and 42c, allowing enough current to pass through lamp 42a to light it, even though the other two switches may be closed at the same time. This is an important feature of the invention; namely, that the several lamps are in series connection, have respectively different resistances sufficient to cause only one of them to glow when two or more are in circuit at the same time, and short circuiting means are provided to divert current from the lamp or lamps of relatively higher resistance and increase the current through the lamp or lamps of lower resistance, with such intensity as to cause the one of the remaining lamps which has the higher resistance to emit light.

The switches 73, 75 and 77 may be operated by the level of gasolene in the fuel tank through any one of a variety of means within the scope of that phase of the invention last described. Consequently the description which follows of one specific controlling means is not to be construed as a limitation of the foregoing phase of the invention, although it does embody an invention for which I claim protection.

The control means here described is operated by a float 79 in the fuel tank, which is shown only in a diagrammatic way but may be of any suitable construction and guided by any suitable means, the necessities and nature of which are so well known to persons acquainted with the devices heretofore used for showing fuel level in automobile tanks as to require no detailed illustration or description. It is sufficient to say that the float in its rise and descent operates an arm 80 which is suitably connected in an electric circuit to close circuits through different ones of a succession of contacts 81, 82, etc. Whether the arm 80 is carried directly by the float, as indicated here, or is supported independently and moved in some manner by the float is immaterial for the purpose of this description. The switches 73, 75 and 77 are thermally operated bimetallic strips with each of which is associated a heating coil 85 connected in series circuit between the bus bars 61 and ground. But preferably, in order to compensate for the ambient temperature each switch is made of two like bimetallic strips mounted in parallel on an insulating base with the dissimilar metals of the two like strips adjacent to one another. The temperature compensating strips are designated by the same reference numerals, modified by the exponent a, as the main elements of the switches. Control of the switches by temperature changes is used in order to damp out the effects of agitation and surging of the liquid in the tank. An appreciable time is required for heating or cooling of the coils and switches enough to close and open them, wherefore the lights are not affected by momentary shifts of the liquid and float when the automobile passes over bumps.

In order to avoid duplication of wires running the length of the vehicle body from switches in or near the gauge to the tank, I prefer to control the circuit of the heater coils by means of a rheostat near the tank, from which only a single wire 86 need be run to the switches near the gauge. The rheostat consists of resistances 87, 88 and 89, between taps with which the contacts 81, 82, 83 and 84 are connected. These resistances are connected in series with the heating coils 85 of the short circuiting switches and with a conductor 90 leading from the bus bar 61.

The several switches 73, 75 and 77 are dissimilar to one another to the extent that they are caused to close by currents of respectively different magnitudes and the rheostat and its tap conductors are so arranged with respect to the float operated switch, that when the tank is full maximum current flows through the heater circuit, and when the switch arm engages the contacts 82, 83 and 84 respectively the current is progressively reduced. With this arrangement the strongest current flow causes switch 73 to close, such flow occurring when the float switch closes the circuit at contact 81. When the float switch is at contact 82, the current flow is reduced, permitting switch 73 to open and causing switches 75 and 77 to remain closed; the current flowing when the float switch makes contact at 83 permits switch 75 to open and causes switch 77 to remain closed, and when the tank is so nearly empty that the float switch leaves contact 83, and engages 84, the rheostat cuts down the current so that all of the switches open. The float switch is grounded on the automobile structure so that it short circuits more or fewer of the resistances of the rheostat according to the quantity of fuel in the tank. Preferably the contact members of the float switch and rheostat are so made and located that there will be a minimum time lag between the opening of circuit at one contact and closing circuit at the next contact, in order that the proper lamp at the dashboard instrument will be illuminated at all times.

The switches 73, 75 and 77 may be made selectively responsive to different temperatures in any one of several ways, as (a) by making the separation between their contacts greatest for switch 73, less for switch 75 and least for switch 77; (b) by making the bimetallic strip of switch 73 of greater thickness so that more heat will be required to deflect it a given amount, and making the strips of switches 75 and 77 of less and still less thickness; and (c) by making the resistance of the heating coil of switch 73 less than of the other coils so that more current will be required to heat it to a given degree, and making the coil of switches 75 and 77 with respectively higher and higher resistances.

In the arrangement here shown, lamp 42a is behind the green light filter, 42b behind the amber light filter, and 42c behind the red filter. Hence when the tank is full a green light shows through the slot 37, when the float switch leaves contact 81 and engages contact 82, an amber light shows through the opening 38, and when the float switch leaves contact 82 and engages contact 83, a red light shows through the opening 39; each of these light indications being exclusive. By suitably locating these contacts and making them longer or shorter in the direction in which the switch arm moves, the change from one light indication to another may be made to occur when the gasolene level is at any selected height in the tank. I have also provided for making the red light flash when the level is so low that immediate replenishment is required. This is accomplished by a thermally operated switch 91 in a shunt circuit between the binding post 71 and ground. A conductor 92 from this binding post leads to a connection at 92a with both the bimetallic contact member of this switch and with one terminal of a heater coil 93 surrounding such bimetallic element, and the opposite terminal of the coil is connected with the complemental contact member 94 of the switch at 92b, and also with ground. When the contacts of this switch are separated, enough current flows through the coil 93 to heat and bend the bimetallic contact, whereby the switch is closed and the heating coil short circuited. The current through the coil is thus reduced so much that it cools off and allows the switch to open. This last named switch operates only when all of the switches 73, 75 and 77 are open. Under such conditions only is the current flow through the coil 93 great enough to generate heat effective to close the switch. The resistance of coil 93 is so great that it allows only enough current to flow through the lamp 42c to produce a dim light, but when the switch is closed enough current passes to make the light bright. Thus a flashing effect is produced.

The means for flashing the low-level indicator and the switch 77 may be omitted if desired to simplify the apparatus, and the low potential terminal of lamp 42c may be connected with bus bar 62, as are certain lamps of other indicators, later described. And the same principle may be extended to a series of four or more lights with or without a flasher circuit, if closer indications of fuel level are desired, by duplication of the elements here disclosed.

The lamps indicating oil pressure, designated 42d and 42e, are connected between the positive and negative bus bars 61 and 62 and in series with one another by conductors 95, 96 and 97, and from the intermediate conductor a binding screw 98 projects, from which a conductor 99 leads to a switch 100 operated by a diaphragm 101 to which oil under pressure is led by a tube 102 from the lubricating system. The movable contact of the switch is insulated, and the complemental contact 103 is grounded. The lamp 42e has a higher resistance than lamp 42d, sufficiently to cause 42e alone to emit light when the full current passes through both lamps in series. But when the shunt circuit 99 is closed, the current through lamp 42e is reduced and that through lamp 42d augmented, causing the latter only to emit light. The switch is closed when the oil pressure is at the normal degree, and opened when the pressure falls below normal. Hence lamp 42d is located back of the slot 31 and lamp 42e back of the opening 32, to give the required indications in accordance with the preceding description.

Without departure from the invention, the arrangement of the oil gauge may be reversed; i. e., the switch may be organized to close when the oil pressure is low, and open when it attains the normal degree. Then by interchanging the high-resistance and low-resistance lamps, the same indications as above described are given.

The lamps 42f and 42g for indicating the water temperature are located back of the openings 33 and 34 respectively and are connected with the positive bus bar by a conductor 104 and with one another by a conductor 105 from which a binding screw 106 projects. A conductor 107 is in series connection with the lamp 42f and with a binding screw 108. Conductive wires 109 and 110 lead from the screws 106 and 108 respectively to insulated contacts 111 and 112, with which thermostatic switches 113 and 114 respectively co-operate. These switches are preferably bimetallic strips mounted in a tube which is inserted at a convenient point in the water jacket of the engine, and through which the strips are grounded. The switch 114 is designed to close when the water temperature has risen to a degree approximating the normal temperature and to open only when the water is chilled substantially below that degree. Switch 113 is designed and arranged to remain open until the water temperature rises to near the boiling point. Lamp 42f has a higher resistance than that of 42g, sufficient to cause it alone to glow when the switch 114 is closed and switch 113 is open, and cause it to become dark when short circuited by closing of switch 113; and lamp 42g has such resistance that it is lighted only when the bypass circuit is closed by switch 113. Thus lamp 42f, in conjunction with the color screen on the index ring and the marking on the dial plate, shows that the water temperature is within the prescribed range for safe operation, when such condition exists, and the lamp 42g correspondingly shows when a potentially dangerous condition exists in the engine cooling system.

Minor variations in the water temperature indicator may be made without departure from the invention, as by connecting the negative terminal of lamp 42f directly to the negative bus bar, eliminating the switch 114 (similarly to the arrangement shown in connection with the oil pressure indicator); or by providing a third lamp in series with 42g and 42f and in permanent connection with ground through the bus bar 62 or otherwise, and having a higher resistance than either 42g or 42f, this latter arrangement being essentially like that of the three lamps used in the fuel level indicator with the omission of the flashing means. This arrangement of three lamps shows, when both switches are open, that the water temperature is below the normal operating degree, as well as the normal operating temperature and the excessively high temperature.

The battery indicator here shown consists of two lamps 42h and 42i back of the openings 35 and 36 respectively in the index ring, connected in series between the positive and negative bus bars by conductors 115, 116 and 117. A binding screw 118 projecting from the intermediate conductor 116 is connected by a wire 119 with a switch 120 operated by a polarized relay 121 (substituted for the ammeter ordinarily provided to show battery conditions) so as to close a bypass circuit with ground when the battery is receiving current in excess of its delivery current. Lamp 42h is of higher resistance than lamp 42i, sufficiently to be illuminated only when the relay switch is open, and the resistance of lamp 42i is such that it is illuminated only when affected by the stronger current flowing through it when the relay switch is closed.

It will be appreciated that all of the indicators embody the same principle, i. e., that of two or more electrical units in series circuit, of respectively different resistances such that only one of them is operated when the full current passes through the circuit, combined with a shunt circuit connected at a point between such electrical devices and adapted to be opened and closed by a switch, with the effect of activating the electrical device of lower resistance and disabling the higher resistance device. Within the scope in which I claim protection for embodiments of this principle may be included other specific electrical devices than incandescent lamps, although I consider lamps preferably to other equivalent devices, and claim them specifically within the less comprehensive aspects of the invention. But in the broad sense the lamps here shown may be considered as typical of all devices which may be applied and used for the purpose.

Substantially like indicators for showing other specific values than those referred to in the foregoing specification may be combined with those herein described within the scope of the protection claimed; and indeed my invention comprehends any of the indicators shown, or any equivalent indicator, by itself as well as in combination with one or more other indicators.

The connection between the battery and the positive bus bar of the indicator instrument is preferably made through a switch 122 so that current need not be consumed except when the automobile is in use. And the switch 122 may be the usual ignition switch of the automobile, or be connected with it for simultaneous operation by the key which opens and closes the ignition switch, whereby action of the instrument is practically limited to such times as the engine is running and charging the battery. I have provided in addition a means to control the brilliance of the lamps so that the indications will be readily apparent in daylight but be not too bright in the night time. Such means consists of a resistance 123 in the supply circuit and a shunt 124 passing around the resistance controlled by a switch 125. I also may provide a ballast resistance 126 at some point in the supply circuit to prevent overloading of the selective indicator elements (lamps) in case the voltage of the battery should exceed that for which the resistances of such elements are designed.

The conductors leading from one lamp to another in the instrument are bars or plates seated in the bottom of the channel 72 in the base ring 41, as shown with respect to the conductor 116 in Fig. 2; and the conductors leading to the bus bars are metal straps riveted to the bus bars, one of which is shown at 97 in Fig. 2. These various conductors are associated with insulating disks 127 (Fig. 2) so as to maintain the necessary electrical insulation between the terminals of the lamp sockets where such terminals are connected with the respective conductors, in a manner well understood in the art.

The channeled rear side of the ring 41 is closed by a cover ring 128, also of insulating material, having holes through which the rigidly mounted binding screws 67, 68, etc. pass. These screws are all parallel to the axis of the rings, which permits easy assemblage of the cover ring with the channeled ring. A binding screw 129 which is connected by a conductive strap 130 with the positive bus bar serves for connection of the wire leading from the battery. The ground connection with the bus bar 62 is made by a conductive strap 131 secured to the ring 41 by a tubular rivet 132 through which a bolt 133 passes, by which the cover ring is secured to the channeled ring, and both are made fast to the casing of the instrument by a lug 134 (Fig. 6), which is welded or oherwise secured to the side of the casing. Lug 134 is conveniently a structural part of one of the brackets 23 by which the instrument is made fast to the instrument board of the automobile; and the other bracket 23 may be of like construction to receive a similar securing bolt.

The instrument is made fast to the back of the instrument board, with its face exposed through a hole in the board, and the metallic fastenings described make sufficiently good conducting paths for the currents. In case renewal of a lamp is required, the insulating ring may be slipped from the rear end of the casing after removal of the bolts 132, but without disturbance of any other connections, and all of the lamps thereby made accessible for renewals and substitutions.

Miniature electric lamps are available for this use having the desired different resistances for operation in the manner described in the range of voltages of automobile batteries and with extremely small consumption of current. Where four indicators are provided in the same instrument, as in this case, four lamps are illuminated practically all the time that the instrument is in service, although different ones of each group of lamps may be illuminated at different times. As these lamps are arranged to illuminate the dial, they dispense with the lamps previously needed for dial illumination alone and consume less current than the electrical indicators of the pointer type heretofore used to convey the information given by my indicators. Not only is no appreciable load imposed on the battery by this combined instrument, but its load is less than that of some of the instruments heretofore used.

In the illustrated embodiment of the invention, the speedometer casing 14 is a necessary part of the supporting structure, since it holds the index ring and dial plate in correct relation to the lamps. However, as previously stated, a clock may be substituted for the speedometer without departure from the invention. For generic definition, so far as concerns the combination here claimed, such a speedometer and clock may be considered as equivalent to one another and may be generically designated as meters.

Many variations in the manner of connecting the several circuits and the locations and arrangements of their circuits and circuit closing means may be made within the spirit and scope of the present invention and of the protection which I claim. So also the several indicators or gauges may be applied for many other specific but essentially analogous uses. For instance, the fuel level indicator may obviously be used for showing different levels of other liquids than gasolene and in other localities than the fuel tank of an automobile. The oil pressure indicator may be applied for use in connection with other fluids, including gases or vapors as well as liquids, and the temperature indicator may likewise be used with any fluids as well as with water. Hence the foregoing description of specific uses is not to be construed as a limitation of the invention.

Neither is the description of a particular means by which a liquid in rising and descending influences different indicators of liquid level a limitation. I have devised other and simpler means than those here shown, which are perfectly satisfactory for use in circumstances where damping out of the effect of waves and surges in the liquid is not important, or where there is no objection to running a multiplicity of wires from the indicator instrument to the tank. I have used installations in which the conductors 74, 76, 78, or their equivalents, are run directly to contacts 81, 82, etc. or their equivalents, respectively. And I have used a single switch adjacent to such contacts, operated by a float in the tank through a pivoted arm to the free end of which the float is secured, a cam on the pivot shaft of such arm, and a diaphragm between the cam and switch, suitably arranged so that the switch is caused to close circuit with the contacts successively as the float rises, and break circuit successively as the float descends, and vice versa.

What I claim and desire to secure by Letters Patent is:

An indicator instrument comprising a plurality of electrical devices in circuit connection with one another, said devices having respectively different resistances such that one of them is made active and the other remains inactive when a current of prescribed magnitude flows through them in series, supply and return connections for currents at respectively opposite ends of the series, a thermally operated circuit closer in one of said connections, a shunt conductor leading from a point between said devices, and a thermally operated circuit closer in series with said shunt conductor, one of said circuit closers being arranged to close and open at a lower temperature than the other.

NICHOLAS NAZAR.